United States Patent [19]

George et al.

[11] Patent Number: 4,557,763

[45] Date of Patent: Dec. 10, 1985

[54] DISPERSANT AND FLUID LOSS ADDITIVES FOR OIL FIELD CEMENTS

[75] Inventors: Charles George; Richard R. Gerke, both of Duncan, Okla.

[73] Assignee: Halliburton Company, Duncan, Okla.

[21] Appl. No.: 615,394

[22] Filed: May 30, 1984

[51] Int. Cl.$^4$ .............................................. C04B 7/354
[52] U.S. Cl. ...................................... 106/90; 106/314; 166/293
[58] Field of Search .................. 106/90, 314; 524/4–6; 166/293

[56] References Cited

U.S. PATENT DOCUMENTS 4,125,497  11/1978  Josten et al. ............................. 524/4

*Primary Examiner*—William R. Dixon, Jr.
*Assistant Examiner*—Steven Capella
*Attorney, Agent, or Firm*—Thomas R. Weaver

[57] ABSTRACT

Dispersants and fluid loss additives for inclusion in oil field cements and methods of using the resultant compositions in oil, gas and water well cementing operations are disclosed. Such compositions incorporate a polymeric additive prepared by caustic-catalyzed condensation for formaldehyde with acetone, or a substance derived from acetone, wherein said polymer includes sodium sulfonate groups in an amount sufficient to render such polymer water soluble. A second fluid loss additive such as hydroxyethyl cellulose, carboxymethylhydroxyethyl cellulose, copolymers of N,N-dimethylacrylamide and 2-acrylamido, 2-methyl propane sulfonic acid or copolymers of acrylamide and 2-acrylamido, 2-methyl propane sulfonic acid may optionally be included.

19 Claims, No Drawings

DISPERSANT AND FLUID LOSS ADDITIVES FOR OIL FIELD CEMENTS

BACKGROUND OF THE INVENTION

For oil field cementing operations to be successful, additives such as fluid loss reducers and dispersants are often required to be added to the cement. Such additives are often used in conjunction with substantial salt concentrations and under conditions where slurry retardation, viscosity, pumpability, and resultant compressive strength development are critical aspects.

The present invention relates to an aqueous cementing composition and method of using same in cementing oil and gas wells and the like. More particularly, the present invention concerns incorporation of a polymer prepared by caustic-catalyzed condensation of formaldehyde with acetone, or a substance derived from acetone, which has been partially sulfited for water-solubility purposes for use in a hydraulic cement slurry as a dispersant, fluid loss reducer, retarder or combination of such properties during cementing operations. Still more particularly, the partially sulfited polymer formed from the condensation of formaldehyde and active methylene compound may be combined with a second fluid loss additive such as the cellulose derivatives carboxymethylhydroxyethyl cellulose or hydroxyethyl cellulose or copolymers of 2-acrylamido, 2-methyl propane sulfonic acid and acrylamide or N,N-dimethylacrylamide and 2-acrylamido, 2-methyl propane sulfonic acid to enhance the fluid loss reducing characteristics.

Dispersing agents are valuable in cement slurries in that they reduce the apparent viscosity of the slurry to permit the pumping of the cement slurry with less friction pressure, and less hydraulic horsepower, and in many instances with turbulent flow characteristics. Turbulent flow characteristics are desirable in that they contribute to more efficient removal of drilling fluids. Reducing friction pressure is desirable since there is a concurrent reduction in the probability of lost circulation. Inclusion of dispersants in cement slurries are also desirable in that such inclusion results in the reduction of the amount of water required during slurry preparation. By reducing the water content of the slurry, cement slurries characterized by improved compressive strength development are produced.

Certain organic acids have long been recognized as cement dispersants by those skilled in the art of cementing wells in the petroleum industry. Such dispersants include gluconic acid and citric acid. However, gluconic acid is also a strong cement retarder and is generally restricted to use in very deep wells having a bottomhole circulating temperature of at least about 200° F. to 250° F. Citric acid, although a weaker retarder, is a less effective dispersant.

A variety of sulfonates, such as sulfonated lignins of sulfomethylated lignins are also known to be cement dispersants. However, many of such sulfonates, especially the lignosulfonates, are strong retarders. In U.S. Pat. No. 4,239,550 flowing agents for concrete and mortar are disclosed. Such patent discloses a flowing agent comprised of a mixture of lignin sulfonate and sulfomethylated or ring-sulfonated aromatic compounds wherein such mixture is after-condensed and after-sulfitized.

Salt (sodium chloride) is also used as a cement dispersant. However, in most cases salt cannot provide flow properties which are sufficiently low to obtain turbulent flow during cement placement operations. Salt is often used for other reasons. For example, during oil field cementing operations it is often desirable to place a cement slurry in the annular space between the surrounding formation and the casing which extends into the well bore. In such an operation the cement slurry is prepared and pumped down the inside of the casing. The slurry flows back up the outside of the casing thereby filling the annular space between the casing and the surrounding formation. The purpose of such activity is to seal the subterranean zones in the formation and to support the casing with respect to the formation. The use of salt in the cement slurry provides several advantages. First, salt containing cement slurries bond more firmly to salt and shale sections often found in subterranean formations. Second, when salt is present in the cement slurry in sufficiently large quantities, it assists in protecting shale sections from sluffing, bridging between formation zones, and washing out, and salt formations from leeching or washing out.

It is often desirable to include various other additives in oil well cement slurries to meet various specific well requirements. Such additives include accelerators, retarders, and fluid loss additives, among others. However, these additives often interact with each other and hence such activity must be taken into account during preparation and use of the slurry.

Another common dispersant is napthalene sulfonic acid condensed with formaldehyde. Such condensate works well as a dispersant with fresh water slurries, but increases, as opposed to decreases, the viscosities of high salt containing cement slurries. Thus, the napthalene sulfonic acid-formaldehyde condensate may not be universally used, it is especially ineffective for situations where it is desired to include high (18% and greater) concentrations of salt in the cement slurry.

Certain polymer compositions have long been recognized by those skilled in the art of cementing wells in the petroleum industry as cementing additives useful in reducing fluid loss from a slurry of cement and water to the surrounding environment, i.e. the formation. These compositions are commonly referred to as "fluid loss additives."

It is desirable to include fluid loss additives in cement slurries for a variety of reasons. First, in primary cementing, loss of fluid to the formation may result in premature gellation of the slurry, or bridging of the annular space between the formation and the casing. Second, in remedial cementing operations control of fluid loss is necessary to achieve the more precise cement placement associated with such operations.

Examples of known fluid loss additives are cellulose derivatives such as hydroxyethyl cellulose and carboxymethylhydroxyethyl cellulose. Another example of a fluid loss additive is found in U.S. Pat. No. 4,015,991 which discloses a hydraulic cement slurry containing such an additive consisting of hydrolyzed copolymers of acrylamide and 2-acrylamido, 2-methyl propane sulfonic acid. Still another example of a fluid loss additive is a copolymer of N,N-dimethylacrylamide and 2-acrylamido, 2-methyl propane sulfonic acid. Such fluid loss additives are commonly combined with napthalene sulfonic acid-formaldehyde condensate to enhance fluid loss control and reduce retardation and slurry apparent viscosity.

As the amount of salt increases the effectiveness of these known fluid loss additives and dispersants decreases requiring the inclusion of greater amounts of such additives to maintain effectiveness. However, such increased amounts of additive adversely affect slurry properties since these additives also act as retarders and viscosifiers. Thus, there is a need for improved fluid loss additives and dispersants that are compatible with increased salt levels and preferably have a wide range of application.

By the present invention, improved additives for use as dispersants and fluid loss additives in oil well cements, as well as methods of using such cements, are provided. The additives are effective in both fresh and salt water cement slurries and are generally compatible with other cement slurry additives.

SUMMARY OF THE INVENTION

Cementing compositions and methods for their use in oil, gas and water well cementing operations are disclosed. More particularly, such compositions are comprised of water, hydraulic cement, and a polymeric additive prepared by caustic-catalyzed condensation of formaldehyde with acetone, or a substance derived from acetone, wherein the polymer includes sodium sulfonate groups in amounts sufficient to render such polymer water soluble. Such polymeric additive may also be blended with any of the known cellulose derivatives that are effective as fluid loss additives, as well as other known fluid loss additives such as hydrolyzed copolymers of 2-acrylamido, 2-methyl propane sulfonic acid and acrylamide and copolymers of N,N-dimethylacrylamide and 2-acrylamido, 2-methyl propane sulfonic acid. Such combinations of the polymeric additive with such second fluid loss additives exhibit improved fluid loss control and alleviate the adverse side effects associated with known fluid loss additives, i.e. high apparent viscosity and retardation. Additionally, increased effectiveness in salt cement slurries is exhibited. Further, methods of cementing a conduit in a borehole penetrating an earthen formation by introducing such a cementing composition into the space between such conduit and formation as well as methods of remedial cementing in oil, gas and water wells, are disclosed.

So that the above-recited features, advantages and objects of the invention, as well as others that will become apparent, are obtained and can be understood in detail, more particular description of the invention is set forth below with respect to typical embodiments thereof, but the described embodiments should not be considered limiting of scope, for the invention may admit to other equally effective embodiments which will be apparent from description to one of ordinary skill in the art.

DESCRIPTION OF THE PREFERRED EMBODIMENTS

New cementing compositions and methods of using the same in oil, gas and water well cementing operations are disclosed. Such compositions are comprised of water, hydraulic cement, and a polymeric additive prepared by caustic-catalyzed condensation of formaldehyde with acetone or a substance derived from acetone wherein such polymer includes sodium sulfonate groups in an amount sufficient to render the polymer water soluble. The result of inclusion of such additive in cementing compositions is the exhibition of better pumpability characteristics, which generally improves drilling fluid removal while reducing the possibility of lost circulation, when cementing a conduit penetrating an earthen formation via introduction of such composition into the space between such conduit and the formation, due to the dispersant, and to some degree fluid loss, characteristics exhibited by the polymeric additive. Additionally, such additive will exhibit the same characteristics when used in remedial cementing operations.

The polymeric additive of the present invention can be made in any acceptable manner that provides as an end result a polymer described as being prepared by caustic-catalyzed condensation of formaldehyde with acetone or a substance derived from acetone, wherein a sufficient amount of sodium sulfonate groups are appended to the polymer to render same water soluble. However, it is preferred in the synthesis process that the acetone and/or formaldehyde be converted in part to their respective sodium bisulfite addition compounds before addition of the caustic catalyst.

One method of preparing the polymer additive described above is to place a desired molar amount of acetone, or acetone derivative, and sodium bisulfite in aqueous solution and treating same with a desired amount of formaldehyde. An aqueous caustic catalyst, as exemplified by a sodium hydroxide or potassium hydroxide is thereafter added in an incremental manner so as to avoid overheating of the reaction mixture. It should be noted that the formaldehydebisulfite addition product may be used in part to replace the formaldehyde, in which case the acetone, or acetone derivative, would not require sulfitation. This last example is a classic sulfomethylation reaction.

In tests using formaldehyde, acetone and sodium bisulfite, it was found that as the ratio of sulfur decreased the efficiency of the polymer as a dispersant increased, but only so long as the polymer remained water soluble. A preferred range of starting material of formaldehyde:acetone:sodium bisulfite was found to be about 6:3:1 moles respectively. In the tables that follow the polymeric additive (later identified as Additive I) included about 15% of the impurity sodium formate. Analytical evaluation of one sample of polymer additive after purification indicated that the elemental analyses were as follows: 42.32% carbon, 4.93% hydrogen, and 11.32% sulfur. Dialysis of one sample of polymer additive in a membrane of a 6,000 to 8,000 molecular weight control rendered a 25% retention. It should be noted that it is preferred to reduce or remove the amount of the sodium formate impurity present.

Such polymeric additive may include a second fluid loss additive such as a cellulose derivative. Preferred cellulose derivatives include hydroxyethyl cellulose ("HEC") and carboxymethylhydroxyethyl cellulose ("CMHEC"). Another example of a preferred second fluid loss additive is hydrolyzed copolymers of acrylamide and 2-acrylamido, 2-methyl propane sulfonic acid ("AMPS/AA" copolymer additive). Still another example of a preferred second fluid loss additive is copolymers of N,N-dimethylacrylamide and 2-acrylamido, 2-methyl propane sulfonic acid ("NNDMA/AMPS" copolymer additive). In such cases, the resultant cementing compositions will exhibit improved fluid loss characteristics when compared to the use of either the polymeric additive or the second fluid loss additives alone, as well as with respect to the expected cumulative effect. Such resultant compositions generally exhibit low viscosity, low fluid loss characteristics and (excepting the polymeric additive in combination with CMHEC) are especially useful in shallow well cementing jobs, where most fluid loss additives cannot be used because they overretard compressive strength development. Such compositions of the present invention are very mild cement retarders even at temperatures as low as 100° F. The combination of the polymeric additive and CMHEC is most useful in high salt-containing slurries and at higher temperatures.

The composition resulting from the combination of polymeric additive and cellulose derivative, NNDMA/AMPS, or AMPS/AA copolymer additive may be used with all API classes of cement and cement blends, as same are defined in the American Petroleum Institute Bulletin entitled "API Specification for Material and Testing for Well Cements" dated January, 1982 and incorporated herein for all purposes and hereinafter referred to as "API Spec 10."

The amount of polymeric additive to second fluid loss additive was found to be preferably a ratio of 5-9 parts by weight polymeric additive to 1 to 5 parts by weight second fluid loss additive. A more preferred ratio is approximately 4:1 parts by weight of polymeric additive to second fluid loss additive. Such a slurry may be used under conditions where the bottom hole circulating temperature ("BHCT") of an oil well is in the range from about ambient to about 160° F. Such a BHCT equates to temperature ranges from the surface level to approximately 10,000 ft. below such surface level. Such a cement composition may be used in combination with salt concentrations of up to 18% when the second fluid loss additive is HEC or either the AMPS/AA or the NNDMA/AMPS copolymer additive. However, it should be noted that as the salt content increases the effectiveness of the additives decrease. If the second fluid loss additive is CMHEC, salt concentrations may be as high as saturation, although it may be necessary to include citric acid to achieve desired fluid loss performance.

The compositions of the present invention act as dispersants and fluid loss additives and as such will cause substantial reductions in the rate of water loss by filtration and in the apparent viscosity of cement slurries. Such compositions are easily mixable and result in good fluid loss control while still exhibiting good flow properties. Under API standards, excellent fluid loss control (50 to 100 cc/30 min) may be achieved by the addition of about 0.5-1.5% by weight of cement of such composition to a normal density cement slurry (approximately 16 lbs/gal). Fluid loss control in filler type cementing compositions with high water requirements (such as Class H cement with 8% bentonite by weight of cement and 9.07 gal water/sack) is generally more modest and may require increased addition of such additives. Typically, a fluid loss of between 75 and 350 cc/30 min. can be obtained with a 1% to 1.5% by weight addition of such additive.

Hence, a desired range of amount of the above described combination of polymeric additive and cellulose derivative, NNDMA/AMPS or AMPS/AA copolymer containing composition to be added is about 0.1-5.0% by weight of cement. A more preferred range of such composition is 0.5-1.5% by weight of cement.

The polymeric additives of the present invention when used alone or in conjunction with a small (30% or less) amount of a second fluid loss additive (excepting CMHEC) exhibit minimal retardation effects on the cement slurry. Such characteristics will generally cause only a small to moderate increase in thickening time depending on temperature and slurry composition. The effect of such additives on compressive strength development is also minimal as may be observed in the compressive strength data in the tables found below.

In order to facilitate a better understanding of the present invention, the following examples are given. With respect to such examples and for ease in the dissemination of information included therein, the following abbreviations are used hereinafter:

1. Additive I—A polymeric additive prepared by caustic-catalyzed condensation of formaldehyde with acetone, or a substance derived from acetone, which includes sodium sulfonate groups in an amount sufficient to render such polymer water soluble.
2. Additive II—A 80:20 blend by weight of Additive I and hydroxyethyl cellulose respectively.
3. Additive III—A blend of Additive I and copolymers of 2-acrylamido, 2-methyl propane sulfonic acid and acrylamide. The ratio of components was varied and described in the below Tables.

Tables I-IV indicate a variety of tests conducted with respect to Additive II and a variety of oil field cements. Table I uses a Class A cement, including a light weight cement which is a 50:50 fly ash to Class A cement blend. Tables II, III and IV illustrate similar tests for Classes C, G and H cements respectively.

These tests vary the percent of Additive II by weight of cement, test temperature, salt content, water content, and include occasional additional additives such as bentonite. Certain slurry characteristics were measured, including consistency, rheological properties, fluid loss, compressive strength, free water, and thickening time. These tests were conducted in accordance with API Spec 10.

Tables I-IV give a fairly comprehensive view of how Additive II performs in various cementing compositions. The results indicate that Additive II is a very effective fluid loss additive from at least as low as 80° F. up to at least 160° F. in all API classes of cement examined. Additive II is a very mild retarder, is salt compatible (up to at least 18%), and is effective in reducing rheologies so that turbulent flow with fluid loss control is a viable option. In the cement blend compositions (where large amounts of mix water are incorporated) occasional unacceptable large amounts of free water have been observed. Such a problem did not manifest itself in normal density compositions and is believed to be due to Additive II's dispersant properties in the extended, high water content slurries. This type of free water problem can be easily remedied by the addition of a small amount of extra bentonite or by addition of an extender such as anhydrous sodium metasilicate or diatomaceous earth. As with all the additives of the present invention, Additive II may be dry blended with the cement or may be included in the cement slurry as an aqueous solution of the dry additive. When in an aqueous solution, the additives of the present invention should be prepared using NaOH or an appropriate biocide to inhibit enzymatic or bacterial degradation of the additives components. Tests verified that equivalent amounts of the liquid version of Additive II gave virtually the same fluid loss values and slurry rheology as dry blended Additive II.

There appears to be a general limit on the aqueous concentration of Additive II that can be easily handled in oil field operations. This limit is about 15% by weight of the aqueous solution. A less preferred limit is from 15% to 20% activity. Upon reaching about 20% activity, such concentration results in a very viscous solution that is not readily pourable and is not easily dispersed in mixing water. It should be noted that during the preparation of liquid samples, some lumping occurred when Additive II was added to the water. Such lamps were caused to be broken and dissolved in 20 minutes or less with continuous stirring.

TABLE I

Performance of Additive II with Class A Cement

| Additive II (Percent*) | Test Temp (°F.) | Atmospheric Consistency (Bc at Test Temp) Init | 10 Min | 20 Min | Calculated Rheological Properties (at Test Temp) N' | K' | Fluid Loss** (at Test Temp) (cc/30 Min) | (PSI***) | Free Water 80° F. (Percent) | Thickening Time API Schedule 5 8000' CSq., 125° F. (Hours:Mins) |
|---|---|---|---|---|---|---|---|---|---|---|
| \multicolumn{11}{c}{Class A Cement with 5.2 gal water/sk} |
| 1.0 | 80 | 4 | 8 | 8 | 0.82 | 0.00651 | 70 | — | — | — |
| 0 | 100 | 7 | 18 | 22 | 0.21 | 0.59516 | — | 3,330 | 0 | 1:15 |
| 0.75 | 100 | 3 | 5 | 6 | 0.72 | 0.00960 | 211 | — | 0 | 2:07 |
| 1.0 | 100 | 3 | 5 | 5 | 0.80 | 0.00713 | 88 | 3,650 | 0 | 2:15 |
| \multicolumn{11}{c}{Class A Cement + 18% Salt by weight of water with 5.2 gal water/sk} |
| 0 | 100 | 11 | 9 | 8 | 0.47 | 0.04428 | — | 2,610 | — | 1:58 |
| 1.0 | 100 | 5 | 17 | 17 | 0.45 | 0.10550 | 195 | 2,700 | — | 3:09 |
| 1.5 | 100 | 6 | 16 | 18 | 0.49 | 0.10052 | 116 | 1,140 | — | — |
| \multicolumn{11}{c}{Class A Cement + 2% CaCl$_2$ by weight of cement with 5.2 gal water/sk} |
| 0 | 100 | 5 | 12 | 13 | 0.22 | 0.36817 | — | — | — | 0:43 |
| 1.0 | 100 | 4 | 9 | 10 | 0.58 | 0.03712 | 204 | — | — | 1:32 |
| 1.5 | 100 | 6 | 8 | 9 | 0.76 | 0.01492 | 58 | — | — | 1:46 |
| \multicolumn{11}{c}{Class A Cement + 4% Bentonite by weight of cement with 7.8 gal water/sk} |
| 0 | 100 | 12 | 23 | 22 | 0.10 | 1.01065 | — | — | — | — |
| 1.0 | 100 | 3 | 3 | 3 | 1.01 | 0.00035 | 198 | — | — | — |
| 1.5 | 100 | 3 | 4 | 4 | 0.93 | 0.00089 | 90 | — | — | — |
| \multicolumn{11}{c}{Class A Cement + 8% Bentonite by weight of cement with 10.4 gal water/sk} |
| 0 | 100 | 13 | 23 | 24 | 0.10 | 0.88926 | — | 980 | 0.0 | 1:28 |
| 1.0 | 100 | 1 | 2 | 2 | 0.96 | 0.00037 | 412 | 970 | 0.6 | 3:26 |
| 1.5 | 100 | 1 | 2 | 3 | 1.02 | 0.00026 | 298 | 940 | 1.4 | — |
| \multicolumn{11}{c}{50:50 Fly Ash to Class A Cement Blend + 2% Bentonite by weight of cement with 5.75 gal water/sk} |
| 0 | 100 | 11 | 21 | 20 | 0.13 | 0.69451 | — | 950 | 0.1 | 1:55 |
| 1.0 | 100 | 2 | 3 | 3 | 0.96 | 0.00075 | 104 | 820 | 4.8 | 3:45 |
| 1.5 | 100 | 3 | 4 | 4 | 0.88 | 0.00196 | 56 | 840 | 1.2 | 4:15 |

*By weight of cement
**API Standard test at 1000 psi and using 325 mesh screen
***24 Hour Compressive Strength (Atmospheric Pressure at Test Temperature)

TABLE II

Performance of Additive II with Class C Cement

| Additive II (Percent*) | Test Temp (°F.) | Atmospheric Consistency (Bc at Test Temp) Init | 10 Min | 20 Min | Calculated Rheological Properties (at Test Temp) N' | K' | Fluid Loss** (at Test Temp) (cc/30 Min) | (PSI***) | Free Water 80° F. (Percent) | Thickening Time API Schedule 5 8000' CSq., 125° F. (Hours:Mins) |
|---|---|---|---|---|---|---|---|---|---|---|
| \multicolumn{11}{c}{Class C Cement with 6.3 gal water/sk} |
| 0 | 80 | 4 | 7 | 7 | 0.37 | 0.06119 | — | 1,630 | 1.4 | 2:31 |
| 0.75 | 80 | 3 | 5 | 5 | 0.70 | 0.00576 | 301 | 1,380 | — | — |
| 1.0 | 80 | 3 | 4 | 4 | 0.83 | 0.00257 | 172 | 1,110 | 0.1 | 5:15 |
| 1.5 | 80 | 3 | 5 | 5 | 0.88 | 0.00286 | 48 | 1,070 | 0.0 | 6:25 |
| \multicolumn{11}{c}{Class C Cement + 2.0% CaCl$_2$ by weight of cement with 6.3 gal water/sk} |
| 0 | — | — | — | — | — | — | — | 2,800 | — | 0:50 |
| 1.0 | 80 | 3 | 7 | 11 | 0.34 | 0.15100 | 276 | 2,380 | — | 1:20 |
| 1.5 | 80 | 4 | 10 | 10 | 0.60 | 0.01742 | 198 | 2,030 | — | 2:00 |
| \multicolumn{11}{c}{50:50 Fly Ash to Class C Cement blend + 2% Bentonite by weight of cement with 6.5 gal water/sk} |
| 0 | 80 | 10 | 16 | 17 | 0.15 | 0.57060 | — | 490 | 0.5 | 2:35 |
| 1.0 | 80 | 3 | 4 | 4 | 1.00 | 0.00056 | 163 | 290 | 2.4 | 8:00+ |
| 1.5 | 80 | 2 | 3 | 3 | 0.90 | 0.00221 | 62 | 190 | 1.2 | 8:00+ |

*By weight of cement
**API Standard test at 1000 psi and using 325 mesh screen
***24 Hour Compressive Strength (Atmospheric Pressure at Test Temperature)

TABLE III

Performance of Additive II with Class G Cement

| Additive II (Percent*) | Test Temp (°F.) | Atmospheric Consistency (Bc at Test Temp) Init | 10 Min | 20 Min | Calculated Rheological Properties (at Test Temp) N' | K' | Fluid Loss** (at Test Temp) (cc/30 Min) | (PSI***) | Free Water 80° F. (Percent) | Thickening Time API Schedule 5 8000' CSq., 125° F. (Hours:Mins) |
|---|---|---|---|---|---|---|---|---|---|---|
| \multicolumn{11}{c}{Class G Cement with 5.0 gal water/sk} |
| 0 | 100 | 5 | 8 | 8 | 0.33 | 0.09111 | — | 2,500 | 0.4 | 1:40 |
| 0.75 | 100 | 3 | 5 | 6 | 0.87 | 0.00219 | 98 | — | 0.1 | 3:29 |
| 1.0 | 100 | 2 | 4 | 4 | 0.90 | 0.00238 | 42 | 2,110 | 0.0 | 3:51 |

TABLE III-continued
Performance of Additive II with Class G Cement

| Additive II (Percent*) | Test Temp (°F.) | Atmospheric Consistency (Bc at Test Temp) | | | Calculated Rheological Properties (at Test Temp) | | Fluid Loss** (at Test Temp) (cc/30 Min) | (PSI***) | Free Water 80° F. (Percent) | Thickening Time API Schedule 5 8000' CSq., 125° F. (Hours:Mins) |
|---|---|---|---|---|---|---|---|---|---|---|
| | | Init | 10 Min | 20 Min | N' | K' | | | | |
| 1.0 | 140 | 3 | 5 | 5 | — | — | 56 | — | — | — |
| Class G Cement + 18% Salt by weight of water with 5.0 gal water/sk | | | | | | | | | | |
| 0 | 100 | 5 | 8 | 8 | 0.32 | 0.10381 | — | 3,780 | — | 1:25 |
| 0.75 | 100 | 2 | 6 | 6 | 0.70 | 0.00786 | 152 | — | — | — |
| 1.0 | 100 | 3 | 5 | 5 | 0.80 | 0.00492 | 92 | 1,240 | — | 6:55 |
| 1.0 | 140 | 4 | 5 | 5 | — | — | 118 | — | — | — |
| Class G Cement + 8% Bentonite by weight of cement with 10.2 gal water/sk | | | | | | | | | | |
| 0 | 100 | 8 | 12 | 12 | 0.07 | 0.74794 | — | 440 | 0.3 | 1:52 |
| 1.0 | 100 | 2 | 3 | 4 | 0.87 | 0.00056 | 323 | — | 2.4 | 2:48 |
| 1.5 | 100 | 1 | 1 | 2 | 1.01 | 0.00023 | 234 | 390 | 14.4 | — |
| 1.5 | 140 | 1 | 1 | 2 | — | — | 280 | — | — | — |
| Class G Cement + 3% Anhydrous Sodium Metasilicate by weight of cement with 11.62 gal water/sk | | | | | | | | | | |
| 0 | 100 | 7 | 9 | 9 | 0.22 | 0.18888 | — | 480 | 0.0 | 1:51 |
| 1.0 | 100 | 12 | 9 | 9 | 0.26 | 0.12615 | 505 | — | 0.0 | 1:26 |
| 1.5 | 100 | 10 | 9 | 8 | 0.40 | 0.04092 | 318 | 400 | 0.0 | — |
| 1.5 | 140 | 12 | 7 | 7 | — | — | 457 | — | — | — |

*By weight of cement
**API Standard test at 1000 psi and using 325 mesh screen
***24 Hour Compressive Strength (Atmospheric Pressure at Test Temperature)

TABLE IV
Performance of Additive II with Class H Cement

| Additive II (Percent*) | Test Temp (°F.) | Atmospheric Consistency (Bc at Test Temp) | | | Calculated Rheological Properties (at Test Temp) | | Fluid Loss** (at Test Temp) (cc/30 Min) | (PSI***) | Free Water 80° F. (Percent) | Thickening Time API Schedule 5 8000' CSq., 125° F. (Hours:Mins) |
|---|---|---|---|---|---|---|---|---|---|---|
| | | Init | 10 Min | 20 Min | N' | K' | | | | |
| Class H Cement with 4.3 gal water/sk | | | | | | | | | | |
| 0 | 100 | 5 | 10 | 11 | 0.37 | 0.12178 | — | 2,050 | 1.2 | 2:10 |
| 0.5 | 100 | 3 | 6 | 6 | 0.98 | 0.00150 | 104 | 1,490 | 0.0 | 3:34 |
| 0.75 | 100 | 4 | 8 | 9 | 0.92 | 0.00281 | 42 | 1,550 | — | — |
| 1.0 | 100 | 4 | 7 | 8 | 0.86 | 0.00536 | 34 | 1,910 | 1.0 | 5:45 |
| 1.5 | — | — | — | — | — | — | — | — | 0.4 | — |
| 0.5 | 140 | 2 | 6 | 7 | 0.95 | 0.00142 | 175 | — | — | — |
| 0.75 | 140 | 5 | 7 | 8 | 0.92 | 0.00205 | 72 | — | — | — |
| 1.0 | 140 | 5 | 6 | 6 | 0.88 | 0.00380 | 44 | — | — | — |
| Class H Cement + 10% Salt by weight of water with 4.3 gal water/sk | | | | | | | | | | |
| 0 | 100 | — | — | — | — | — | — | 3,370 | 0.1 | 1:20 |
| 0.75 | 100 | 5 | 7 | 7 | 0.87 | 0.00428 | 106 | 2,380 | 0.0 | 3:58 |
| 1.0 | 100 | 5 | 7 | 8 | 0.83 | 0.00768 | 50 | 1,720 | 0.1 | 4:15 |
| 0.75 | 140 | 4 | 7 | 8 | 0.85 | 0.00426 | 171 | — | — | — |
| 1.0 | 140 | 5 | 8 | 8 | — | — | 104 | — | — | — |
| Class H Cement + 18% Salt by weight of water with 4.3 gal water/sk | | | | | | | | | | |
| 0 | 100 | 5 | 8 | 9 | 0.45 | 0.05324 | — | 2,270 | 0.4 | 1:48 |
| 0.75 | 100 | 5 | 7 | 8 | 0.85 | 0.00531 | 144 | 500 | 0.0 | 6:15 |
| 1.0 | 100 | 5 | 9 | 9 | 0.86 | 0.00644 | 92 | 70 | 0.0 | 6:30+ |
| 0 | 140 | — | — | — | — | — | — | 3,310 | — | — |
| 0.75 | 140 | 5 | 7 | 8 | 0.58 | 0.03197 | 226 | 1,180 | — | — |
| 1.0 | 140 | 5 | 8 | 7 | — | — | 152 | 91 | — | — |
| Class H Cement + 3% KCl by weight of water with 4.3 gal water/sk | | | | | | | | | | |
| 1.0 | 100 | 5 | 8 | 8 | 0.83 | 0.00639 | 36 | — | — | — |
| Class H Cement + 5% KCl by weight of water with 4.3 gal water/sk | | | | | | | | | | |
| 1.0 | 100 | 6 | 8 | 9 | 0.89 | 0.00463 | 42 | — | — | — |
| Class H Cement with 5.2 gal water/sk | | | | | | | | | | |
| 1.0 | 80 | 3 | 6 | 7 | 1.01 | 0.00110 | 28 | — | — | — |
| 0 | 100 | — | — | — | — | — | — | 1,440 | 4.5 | 2:56 |
| 0.5 | 100 | — | — | — | — | — | — | 1,170 | 0.5 | 5:39 |
| 0.75 | 100 | — | — | — | — | — | — | 1,360 | — | 5:46 |
| 1.0 | 100 | 3 | 5 | 6 | — | — | 38 | 1,290 | 3.4 | 6:10 |
| 1.0 | 140 | 3 | 5 | 7 | — | — | 72 | — | — | — |
| Class H Cement + 12% Salt by weight of water with 5.2 gal water/sk | | | | | | | | | | |
| 0 | 100 | — | — | — | — | — | — | 2,100 | 0.4 | 2:07 |
| 0.75 | 100 | — | — | — | — | — | — | 1,660 | — | 5:28 |
| 1.0 | 100 | — | — | — | — | — | — | 1,100 | 0.8 | 6:09 |
| 1.0 | 80 | 2 | 4 | 5 | 0.95 | 0.00180 | 74 | — | — | — |
| Class H Cement + 4% Bentonite by weight of cement with 6.69 gal water/sk | | | | | | | | | | |
| 0 | 100 | — | — | — | — | — | — | 890 | — | 2:05 |
| 1.0 | 100 | 2 | 5 | 5 | 1.20 | 0.00011 | 287 | 860 | — | 4:13 |
| 1.5 | 100 | 2 | 5 | 5 | 1.02 | 0.00057 | 118 | — | — | 5:10 |

TABLE IV-continued

Performance of Additive II with Class H Cement

| Additive II (Percent*) | Test Temp (°F.) | Atmospheric Consistency (Bc at Test Temp) Init | 10 Min | 20 Min | Calculated Rheological Properties (at Test Temp) N' | K' | Fluid Loss** (at Test Temp) (cc/30 Min) | (PSI***) | Free Water 80° F. (Percent) | Thickening Time API Schedule 5 8000' CSq., 125° F. (Hours:Mins) |
|---|---|---|---|---|---|---|---|---|---|---|
| 1.0 | 140 | 1 | 4 | 4 | — | — | 411 | — | — | — |
| Class H Cement + 8% Bentonite by weight of cement with 9.07 gal water/sk ||||||||||| 
| 0 | 100 | — | — | — | — | — | — | 360 | 0.2 | 2:08 |
| 1.0 | 100 | 3 | 3 | 3 | 0.84 | 0.00139 | 357 | 370 | 0.3 | 3:55 |
| 1.5 | 100 | 2 | 4 | 5 | 1.07 | 0.00022 | 300 | — | — | 4:55 |
| 2.0 | 100 | 1 | 2 | 3 | 1.05 | 0.00027 | 276 | 305 | 0.3 | — |
| 1.0 | 140 | 2 | 3 | 3 | — | — | 309 | — | — | — |
| 50:50 Fly Ash to Class H Cement Blend Including 2% Bentonite by weight of cement with 5.75 gal water/sk ||||||||||| 
| 1.0 | 80 | 2 | 4 | 4 | 1.09 | 0.00027 | 104 | — | — | — |
| 0 | 100 | 6 | 12 | 14 | 0.15 | 0.45036 | — | 220 | 0.6 | 4:20 |
| 1.0 | 100 | 2 | 3 | 4 | 1.09 | 0.00023 | 134 | 80 | 5.3 | 11:22 |
| 1.5 | 100 | 1 | 3 | 3 | 0.99 | 0.00082 | 46 | — | 2.2 | 11:52 |
| 1.0 | 140 | 1 | 2 | 2 | — | — | 181 | — | — | — |
| 35:65 Fly Ash to Class H Cement Blend Including 6% Bentonite by weight of cement with 9.9 gal water/sk - 12.7 lb/gal ||||||||||| 
| 0 | 100 | — | — | — | — | — | — | 80 | 1.1 | 3:54 |
| 1.0 | 100 | 1 | 2 | 2 | 0.92 | 0.00036 | 366 | 90 | 9.6 | 13:30 |
| 1.5 | 100 | 1 | 3 | 3 | 1.14 | 0.00009 | 319 | — | 13.2 | 15:40 |
| 1.0 | 140 | 1 | 2 | 2 | — | — | 426 | — | — | — |

*By weight of cement
**API Standard test at 1000 psi and using 325 mesh screen
***24 Hour Compressive Strength (Atmospheric Pressure at Test Temperature)

Tables V–VIII reflect the use of Additive III. Here, Additive I is used in conjunction with a second known fluid loss additive. This second fluid loss additive is a copolymer of 2-acrylamido, 2-methyl propane sulfonic acid and acrylamide ("AMPS/AA additive"). The test results found in Tables V–VIII indicate that a 9:1 ratio blend of Additive III produces superior performance when compared to Additive II with respect to fluid loss control and free water in the light weight slurry compositions.

Fluid loss performance of Additive III in normal density Class H cement with 10% and 18% salt was found to be less preferred than cement slurries containing Additive II. However, the compressive strength obtained in tests utilizing Additive III in conjunction with the salt slurries was better than that previously observed with Additive II.

The use of copolymers of 2-acrylamido, 2-methyl propane sulfonic acid and acrylamide ("AMPS/AA" copolymeric additive) as cement additives is well known as are the characteristics shown with respect to such use. One such characteristic is that cement slurries containing the AMPS/AA copolymeric additive generally perform well only between the temperatures of about 95° F. and 140° F. However, a blended material, Additive III, was found to perform well between temperature ranges of at least as low as 80° F. and at least as high as 160° F. In fact, use of Additive III at 80° F. was found to be virtually the same with respect to fluid loss control as found at 100° F. (see Tables VI and VII). Further, while some retardation of compressive strength development is indicated at 140° F. and 200° F., compressive strengths remain acceptable.

TABLE V

DATA
Slurry Performance Tests of Additive III at 100° F. and Compressive Strength Tests

| Additive III Amount* | Ratio** | Atmospheric Consistency (Bc) at 100° F. Initial | 10 min. | 20 min. | Rheological Properties Fann Readings at 100° F. 600 | 300 | 200 | 100 | Fluid Loss*** at 100° F. (cc/30 min.) | 24 Hour Compressive Strength-psi (1 Atm. Press.) 100° F. | 140° F. | (3000 psi) 200° F. |
|---|---|---|---|---|---|---|---|---|---|---|---|---|
| Class H Cement with 4.3 gal water/sk ||||||||||||| 
| 0 | — | — | — | — | — | — | — | — | — | 1540 | 4460 | 4490 |
| 0.5 | 9:1 | 3 | 5 | 5 | 109 | 50 | 34 | 19 | 260 | — | — | — |
| 0.75 | 9:1 | 3 | 6 | 8 | 110 | 51 | 33 | 16 | 98 | 1350 | 2860 | 3080 |
| 1.0 | 9:1 | 5 | 7 | 7 | 132 | 68 | 45 | 23 | 42 | 1160 | 2940 | 2600 |
| 0.5 | 4:1 | 4 | 6 | 6 | 170 | 85 | 58 | 32 | 204 | — | — | — |
| 0.75 | 4:1 | 4 | 6 | 7 | 188 | 95 | 63 | 33 | 102 | — | — | — |
| 1.0 | 4:1 | 5 | 7 | 9 | 234 | 122 | 82 | 43 | 56 | — | — | — |
| 0.5 | 2:1 | 5 | 8 | 8 | 256 | 140 | 97 | 56 | 207 | — | — | — |
| 0.75 | 2:1 | 7 | 10 | 10 | 279 | 152 | 109 | 60 | 64 | — | — | — |
| 1.0 | 2:1 | 9 | 12 | 12 | 300+ | 217 | 152 | 82 | 98 | — | — | — |
| 0.5 | 1:1 | 8 | 12 | 13 | 300+ | 224 | 162 | 96 | 137 | — | — | — |
| 0.75 | 1:1 | 9 | 13 | 13 | 300+ | 288 | 193 | 113 | 78 | — | — | — |
| Class H Cement + 10% Salt by weight of water with 4.3 gal water/sk ||||||||||||| 
| 0 | — | — | — | — | — | — | — | — | — | 3980 | 4520 | 5050 |
| 1.0 | 9:1 | 4 | 6 | 6 | 150 | 71 | 46 | 23 | 168 | 2060 | 2460 | 3330 |
| 1.0 | 4:1 | 5 | 8 | 9 | 263 | 135 | 86 | 44 | 164 | — | — | — |
| Class H Cement + 18% Salt by weight of water with 4.3 gal water/sk ||||||||||||| 
| 0 | — | — | — | — | — | — | — | — | — | 3060 | 4610 | 4240 |
| 1.0 | 9:1 | 4 | 6 | 7 | 192 | 85 | 56 | 30 | 201 | 1380 | 1350 | 2300 |
| 1.0 | 4:1 | 5 | 8 | 9 | 300+ | 157 | 100 | 51 | 190 | — | — | — |

TABLE V-continued

DATA
Slurry Performance Tests of Additive III at 100° F. and Compressive Strength Tests

| Additive III | | Atmospheric Consistency (Bc) at 100° F. | | | Rheological Properties Fann Readings at 100° F. | | | | Fluid Loss*** at 100° F. | 24 Hour Compressive Strength-psi (1 Atm. Press.) (3000 psi) | | |
|---|---|---|---|---|---|---|---|---|---|---|---|---|
| Amount* | Ratio** | Initial | 10 min. | 20 min. | 600 | 300 | 200 | 100 | (cc/30 min.) | 100° F. | 140° F. | 200° F. |
| Class H Cement + 8% Bentonite by weight of cement with 9.07 gal water/sk | | | | | | | | | | | | |
| 0 | — | — | — | — | — | — | — | — | — | 320 | 550 | 750 |
| 1.0 | 9:1 | 2 | 3 | 4 | 51 | 19 | 12 | 6 | 104 | 350 | 540 | 1240 |
| 0.75 | 4:1 | 3 | 3 | 3 | 85 | 32 | 20 | 11 | 102 | — | — | — |
| 1.0 | 4:1 | 4 | 4 | 4 | 92 | 46 | 24 | 11 | 66 | — | — | — |
| 0.75 | 2:1 | 10 | 6 | 6 | 135 | 56 | 38 | 24 | 76 | — | — | — |
| 1.0 | 2:1 | 2 | 3 | 4 | 111 | 43 | 24 | 11 | 74 | — | — | — |
| Class H Cement + 12% Bentonite by weight of cement with 11.46 gal water/sk | | | | | | | | | | | | |
| 0 | — | — | — | — | — | — | — | — | — | 210 | 310 | 400 |
| 0.75 | 9:1 | 1 | 2 | 2 | 38 | 16 | 11 | 7 | 120 | — | — | — |
| 1.0 | 9:1 | 1 | 2 | 3 | 38 | 17 | 12 | 7 | 88 | 200 | 310 | 650 |
| 0.75 | 4:1 | 2 | 3 | 3 | 47 | 20 | 14 | 8 | 110 | — | — | — |
| 1.0 | 4:1 | 1 | 2 | 3 | 63 | 22 | 12 | 7 | 80 | — | — | — |
| 0.75 | 2:1 | 14 | 9 | 7 | 132 | 61 | 48 | 35 | 72 | — | — | — |
| 1.0 | 2:1 | 8 | 5 | 5 | 142 | 60 | 39 | 23 | 60 | — | — | — |
| 0.75 | 1:1 | 31 | 18 | 16 | 300+ | 288 | 217 | 157 | 82 | — | — | — |
| 1.0 | 1:1 | 22 | 14 | 10 | 269 | 140 | 94 | 57 | 44 | — | — | — |
| 35:65 Fly Ash to Class H Cement Blend Including 6% Bentonite by weight of cement with 9.9 gal water/sk | | | | | | | | | | | | |
| 0 | — | — | — | — | — | — | — | — | — | 80 | 70 | 570 |
| 0.75 | 9:1 | 1 | 2 | 2 | 31 | 11 | 6 | 3 | 283 | — | — | — |
| 1.0 | 9:1 | 3 | 5 | 4 | 54 | 20 | 6 | 3 | 178 | 90 | 20 | 380 |
| 1.5 | 9:1 | — | — | — | — | — | — | — | — | 60 | n.s. | n.s. |
| 0.75 | 4:1 | 3 | 5 | 4 | 65 | 35 | 19 | 4 | 186 | — | — | — |
| 1.0 | 4:1 | 1 | 2 | 2 | 55 | 11 | 6 | 4 | 124 | — | — | — |
| 0.75 | 2:1 | 1 | 8 | 3 | 154 | 72 | 38 | 6 | 110 | — | — | — |
| 1.0 | 2:1 | 1 | 2 | 3 | 104 | 29 | 14 | 7 | 96 | — | — | — |
| 0.75 | 1:1 | 2 | 4 | 4 | 71 | 34 | 24 | 13 | 130 | — | — | — |
| 1.0 | 1:1 | 2 | 3 | 3 | 73 | 35 | 25 | 14 | 98 | — | — | — |
| Class H Cement with 4.3 gal water/sk | | | | | | | | | | | | |
| 1.0**** | 9:1 | 5 | 7 | 7 | 160 | 86 | 59 | 30 | 34 | 1390 | — | — |

*Percent by weight of Cement
**This is the ratio of Additive I to copolymer (2-acrylamido, 2-methyl propane sulfonic acid and acrylamide).
***API Standard test at 1000 psi and using 325 mesh screen
****These tests were performed with a 1.0% equivalent of a 10% solution of 9:1 ratio of polymeric additive to AMPS/AA polymer containing approximately 0.14% NaOH.

TABLE VI

DATA
Slurry Performance Tests using Additive III at 80° F.

| Additive III | | Atmospheric Consistency (Bc) at 80° F. | | | Rheological Properties Fann Readings at 100° F. | | | | Fluid Loss*** at 80° F. |
|---|---|---|---|---|---|---|---|---|---|
| Amount* | Ratio* | Initial | 10 min. | 20 min. | 600 | 300 | 200 | 100 | (cc/30 min.) |
| Class H Cement with 4.3 gal water/sk | | | | | | | | | |
| 1.0 | 9:1 | 3 | n.r. | 9 | 141 | 66 | 42 | 20 | 38 |
| Class H Cement + 12% Bentonite by weight of cement with 11.46 gal water/sk | | | | | | | | | |
| 1.0 | 9:1 | 2 | 3 | 4 | 53 | 19 | 12 | 8 | 78 |
| 35:65 Fly Ash to Class H Cement Blend + 6% Bentonite by weight of cement with 9.9 gal water/sk | | | | | | | | | |
| 1.0 | 9:1 | 2 | 2 | 3 | 34 | 11 | 6 | 3 | 180 |

*Percent by weight of Cement
**This is the ratio of Additive I to copolymer (2-acrylamido, 2-methyl propane sulfonic acid and acrylamide).
***API Standard test at 1000 psi and using 325 mesh screen

TABLE VII

Free Water Tests

| Additive Used | | Atmospheric Consistency (Bc) at 80° F. | | | Free Water (Percent) |
|---|---|---|---|---|---|
| Amount* | Ratio** | Initial | 10 min. | 20 min. | |
| Class H Cement with 4.3 gal water/sk | | | | | |
| 1.0 | 9:1 | 4 | 6 | 6 | 2.4 |
| Class H Cement + 12% Bentonite (by weight of cement) with 11.46 gal water/sk | | | | | |
| 1.0 | 9:1 | 1 | 2 | 3 | trace |
| 35:65 Fly Ash to Class H Cement Blend Including 6% Bentonite by weight of cement with 9.9 gal water/sk | | | | | |
| 1.0 | 9:1 | 1 | 2 | 2 | 2.0 |
| 1.0 | 4:1 | 1 | 1 | 2 | trace |

*Percent by weight of Cement
**This is the ratio of polymeric additive to copolymer (2-Acrylamido, 2-methyl propane sulfonic acid and acrylamide).

TABLE VIII

Thickening Time Tests

Slurry No. 1: Class H Cement + 0.75% of a 4:1 ratio of Additive III mixed with 4.3 gal water/sk Slurry No. 2: Class H Cement + 12% Bentonite (by weight of cement) + 1.0% of a 4:1 ratio of Additive III mixed with 11.46 gal water/sk Slurry No. 3: 35:65 Fly Ash to Class H Cement Blend including 6% by weight Bentonite + 1.0% of a 4:1 ratio of Additive III mixed with 9.9 gal water/sk

| Slurry No. | Thickening Time (Hours:Minutes) API Sch. 5 (BHCT = 125° F.) | API Sch. 7 (BHCT = 172° F.) |
|---|---|---|
| 1 | 3:36 | 4:00 |
| 2 | 2:23 | 1:23 |
| 3 | 8:00+ | 8:00+ |

A third series of tests, the results of which are found in Tables IX–XIV, were conducted to determine the dispersant characteristics of Additive I. Although Additive I is useful as a dispersant in cement slurries without salt, an important characteristic is Additive I's ability to reduce rheologies of cement slurries containing large amounts of salt (18% by weight-to saturation). The rheology data found in Tables IX–XI indicate that Additive I is an effective cement dispersant at temperatures ranging from at least as low as 100° F. to at least as high as 190° F. However, it must be remembered that salt alone is an effective cement dispersant. Hence, cement slurries containing salt and 0% Additive I are substantially thinner than cement slurries containing 0% of Additive I and fresh water. Further, one important characteristic is Additive I's ability to permit the obtainment of turbulent flow during cementing at a reasonable pumping rate. Such rate is between 5 and 10 barrels per minute.

In Table XII the thickening times for slurries containing 0%, 18% and saturated salt (37.2%) by weight of mix water are evaluated. These tests were performed under conditions simulating a moderate depth well (8,000 ft). These results indicate the relatively mild retarding effect of Additive I.

TABLE IX

Dispersant Properties of Additive I in Cement with Fresh Water

| Test Temp (°F.) | Additive I* | Atmospheric Consistency (Bc) at Test Temp | | | Rheological Properties Fann Viscometer | | | | Calculated | | Calculated Turbulence Rate** (BPM) |
|---|---|---|---|---|---|---|---|---|---|---|---|
| | | Initial | 10 min. | 20 min. | 600 | 300 | 200 | 100 | n' | k' | |
| Class H Cement with 4.3 gal water/sk | | | | | | | | | | | |
| 100 | 0 | 5 | 10 | 11 | 153 | 121 | 99 | 79 | 0.38 | 0.12165 | 22.6 |
| 100 | 0.5 | 2 | 7 | 7 | 61 | 23 | 12 | 6 | 1.31 | 0.00007 | 2.3+ |
| 100 | 0.75 | 3 | 8 | 7 | 71 | 26 | 12 | 6 | 1.41 | 0.00004 | 1.9+ |
| 140 | 0.75 | 2 | 3 | 3 | 55 | 19 | 10 | 4 | 1.47 | 0.00002 | 0.8+ |
| 190 | 0.75 | 2 | 6 | 5 | 73 | 29 | 20 | 10 | 1.10 | 0.00036 | 5.5+ |

*Percent by weight of Cement
**Minimum pumping rate required for Reynold's number of 3000 between 7⅞" pipe and 9⅞" hole
+These slurries settled. Turbulence rates are of doubtful significance. In fresh water slurries the use of Additive I at concentrations greater than or equal to 0.5% can result in slurry settling under dynamic conditions.

TABLE X

Dispersant Properties of Additive I in Cement With 18% Salt by Weight of Water

| Test Temp (°F.) | Additive I* | Atmospheric Consistency (Bc) at Test Temp | | | Rheological Properties Fann Viscometer | | | | Calculated | | Calculated Turbulence Rate** (BPM) |
|---|---|---|---|---|---|---|---|---|---|---|---|
| | | Initial | 10 min. | 20 min. | 600 | 300 | 200 | 100 | n' | k' | |
| Class H Cement + 18% Salt by weight of water with 4.3 gal water/sk | | | | | | | | | | | |
| 100 | 0 | 5 | 8 | 9 | 120 | 82 | 69 | 53 | 0.45 | 0.05315 | 18.1 |
| 100 | 0.5 | 3 | 5 | 5 | 86 | 44 | 30 | 18 | 0.88 | 0.00204 | 9.7 |
| 100 | 0.75 | 2 | 6 | 7 | 80 | 37 | 24 | 12 | 1.06 | 0.00054 | 6.9 |
| 100 | 1.0 | 2 | 6 | 7 | 77 | 35 | 23 | 12 | 1.04 | 0.00060 | 6.8 |
| 140 | 0 | 5 | 9 | 9 | 118 | 79 | 67 | 52 | 0.45 | 0.05172 | 17.8 |
| 140 | 0.5 | 2 | 5 | 5 | 86 | 54 | 44 | 33 | 0.53 | 0.02177 | 13.6 |
| 140 | 0.75 | 2 | 5 | 5 | 84 | 41 | 30 | 18 | 0.86 | 0.00226 | 9.6 |
| 140 | 1.0 | 2 | 5 | 5 | 80 | 41 | 30 | 17 | 0.86 | 0.00214 | 9.4 |
| 190 | 0 | 7 | 8 | 10 | 104 | 70 | 54 | 39 | 0.55 | 0.02387 | 15.7 |
| 190 | 0.5 | 2 | 5 | 8 | 88 | 58 | 48 | 38 | 0.47 | 0.03484 | 14.5 |
| 190 | 0.75 | 2 | 5 | 5 | 70 | 29 | 25 | 15 | 0.84 | 0.00204 | 8.0 |
| 190 | 1.0 | 1 | 4 | 5 | 70 | 26 | 17 | 9 | 1.14 | 0.00025 | 4.5 |

*Percent by weight of Cement
**Minimum pumping rate required for Reynold's Number of 3000 between 7⅞" pipe and 9⅞" hole

TABLE XI

Dispersant Properties of Additives I in Cement With Saturated Salt

| Test Temp (°F.) | Additive I* | Atmospheric Consistency (Bc) at Test Temp | | | Rheological Properties Fann Viscometer | | | | Calculated | | Calculated Turbulence Rate** (BPM) |
|---|---|---|---|---|---|---|---|---|---|---|---|
| | | Initial | 10 min. | 20 min. | 600 | 300 | 200 | 100 | n' | k' | |
| Class H Cement + Saturated Salt (37.2% Salt by Weight of Mix Water) With 4.3 gal water/sk | | | | | | | | | | | |
| 100 | 0 | 6 | 8 | 7 | 110 | 66 | 54 | 35 | 0.63 | 0.01431 | 15.1 |
| 100 | 0.5 | 3 | 6 | 7 | 118 | 76 | 62 | 43 | 0.56 | 0.02539 | 16.7 |
| 100 | 0.75 | 4 | 6 | 7 | 111 | 58 | 39 | 23 | 0.88 | 0.00254 | 12.1 |

TABLE XI-continued

Dispersant Properties of Additives I in Cement With Saturated Salt

| Test Temp (°F.) | Additive I* | Atmospheric Consistency (Bc) at Test Temp | | | Rheological Properties | | | | | | Calculated Turbulence Rate** (BPM) |
|---|---|---|---|---|---|---|---|---|---|---|---|
| | | Initial | 10 min. | 20 min. | Fann Viscometer | | | | Calculated | | |
| | | | | | 600 | 300 | 200 | 100 | n' | k' | |
| 100 | 1.0 | 4 | 6 | 8 | 118 | 67 | 48 | 28 | 0.80 | 0.00478 | 14.0 |
| 140 | 0 | 7 | 7 | 7 | 96 | 60 | 50 | 36 | 0.54 | 0.02289 | 14.5 |
| 140 | 0.5 | 3 | 5 | 5 | 71 | 34 | 23 | 14 | 0.91 | 0.00132 | 7.5 |
| 140 | 0.75 | 3 | 6 | 7 | 71 | 32 | 21 | 11 | 1.04 | 0.00054 | 6.1 |
| 140 | 1.0 | 3 | 5 | 5 | 78 | 38 | 26 | 14 | 0.96 | 0.00107 | 7.8 |
| 190 | 0 | 5 | 7 | 7 | 96 | 57 | 46 | 31 | 0.63 | 0.01290 | 13.6 |
| 190 | 0.5 | 3 | 5 | 5 | 70 | 35 | 28 | 18 | 0.75 | 0.00390 | 9.2 |
| 190 | 0.75 | 2 | 5 | 4 | 58 | 23 | 14 | 8 | 1.11 | 0.00026 | 3.9 |
| 190 | 1.0 | 3 | 6 | 6 | 52 | 21 | 13 | 7 | 1.12 | 0.00022 | 3.4 |

*Percent by weight of Cement
**Minimum pumping rate required for Reynold's Number of 3000 between 7⅞" pipe and 9⅞" hole

TABLE XII

Thickening Time of Slurries With and Without Additive I

| Salt* | Additive (% by wt. of cement) | Thickening Time (Hours:Minutes) API Schedule 5** |
|---|---|---|
| Class H Cement With 4.3 gal water/sk | | |
| 0 | 0.0 | 1:38 |
| 0 | 0.75 | 3:05 |
| 18 | 0.0 | 1:29 |
| 18 | 1.0 | 3:26 |
| Sat.+ | 0.0 | 7:17 |
| Sat. | 1.0 | 8:50 |

*Percent by weight of mix water
**BHCT = 125° F., BHP = 5200 psi (reached in 28 minutes). Tests terminated at 70 Bc.
+Saturated at 140° F., 37.2% by weight of mix water Tables XIII and XIV relate to the use of Additive I blended with varying ratios of hydroxyethyl cellulose and carboxymethylhydroxyethyl cellulose. In Table XIV citric acid is included in the cement slurry to aid achievement of the desired slurry properties, in particular fluid loss control.

The blend of Additive I and CMHEC results in a composition that is useful in cement slurries containing high concentrations of salt (18% to saturation) or high temperatures.

TABLE XIII

Additive I with Hydroxyethylcellulose ("HEC") and Carboxymethylhydroxyethyl cellulose ("CMHEC") in Fresh Water Cement Rheological Properties and Fluid Loss Tests at 190° F.

| Second Fluid Loss Additive* | Additive I* | Atmospheric Consistometer at 190° F.(Bc) | | Fann Viscometer | | | | Calculated | | Fluid Loss 325 M.S., 1000 psi (cc/30 Min) |
|---|---|---|---|---|---|---|---|---|---|---|
| | | Initial | 20 Min | 600 | 300 | 200 | 100 | n' | k' | |
| Class H Cement With 4.3 gal water/sk | | | | | | | | | | |
| 0.33% HEC | 0.66 | 7 | 9 | 288 | 173 | 131 | 81 | 0.71 | 0.02270 | 62 |
| 0.25% HEC | 0.75 | 5 | 6 | 195 | 110 | 84 | 49 | 0.77 | 0.01018 | 84 |
| 0.25% CMHEC | 0.75 | 5 | 7 | 163 | 111 | 87 | 53 | 0.63 | 0.02335 | 80 |

*Percent by weight of cement

TABLE XIV

Additive I with Carboxymethylhydroxyethyl Cellulose ("CMHEC") in Saturated Salt Cement Rheological, Properties and Fluid Loss at 190° F.

| Additive I* | Atmospheric Consistometer at 190° F. (Bc) | | | Rheological Properties | | | | | | Fluid Loss 325 M.S., 1000 psi (cc/30 Min) |
|---|---|---|---|---|---|---|---|---|---|---|
| | Initial | 10 Min | 20 Min | Fann Viscometer | | | | Calculated | | |
| | | | | 600 | 300 | 200 | 100 | n' | k' | |
| Class H Cement + Salt (37.2% by weight of mix water) + 0.3% CMHEC (by weight of cement) + 0.2% citric acid (by weight of cement) with 4.3 gal water/sk | | | | | | | | | | |
| 0 | 10 | 5 | 5 | 77 | 35 | 24 | 11 | 1.08 | 0.00046 | 148 |
| 0.75 | 10 | 5 | 7 | 100 | 51 | 34 | 17 | 0.99 | 0.00113 | 110 |
| 1.0 | 10 | 5 | 6 | 104 | 55 | 37 | 20 | 0.92 | 0.00184 | 64 |
| Class H Cement + Saturated Salt + 0.5% CMHEC (by weight of cement) + 0.2% Citric Acid (by weight of cement) with 4.3 gal water/sk | | | | | | | | | | |
| 0 | 11 | 5 | 5 | 123 | 61 | 42 | 21 | 0.98 | 0.00143 | 48 |
| 0.75 | 14 | 5 | 6 | 152 | 84 | 60 | 32 | 0.87 | 0.00399 | 20 |
| 1.0 | 11 | 6 | 6 | 164 | 91 | 64 | 35 | 0.86 | 0.00446 | 16 |

*Percent by weight of cement

Hence, a preferred dispersing fluid loss additive for salt or fresh water slurries is a polymer prepared by caustic-catalyzed condensation of formaldehyde with acetone or a substance derived from acetone wherein such polymer includes sufficient sodium sulfonate groups to render such polymer water soluble. Such polymeric additive increases the effectiveness of other known second fluid loss additives including copolymers of AMPS/AA and NNDMA/AMPS as well as cellulose derivatives such as hydroxyethyl cellulose and carboxymethylhydroxyethyl cellulose. Such additive or additive blends are preferably present in the cement in an amount of between about 0.1% and about 5.0% by weight of cement. A more preferred amount range is 0.5% to 1.5% by weight of cement.

What is claimed is:

1. A cementing composition useful in cementing oil, gas and water wells comprising:
   water;
   hydraulic cement; and,
   a water-soluble additive consisting essentially of a polymer prepared by caustic-catalyzed condensation of formaldehyde with acetone or a substance derived from acetone, wherein said polymer contains sodium sulfonate groups.

2. The composition of claim 1 wherein said additive is present in an amount in the range of from about 0.1% to about 5.0% by weight of the cement.

3. The composition of claim 1 wherein said additive is present in an amount in the range of from about 0.5% to about 1.5% by weight of the cement.

4. The composition of claim 3 wherein the said substance derived from acetone is methyl vinyl ketone.

5. The composition of claim 3 wherein the sodium sulfonate groups of said polymer are incorporated via addition of sodium sulfite or sodium bisulfite to the condensation reaction mixture.

6. The composition of claim 1 further comprising a second additive selected from the group consisting of hydroxyethyl cellulose, carboxymethylhydroxyethyl cellulose, copolymers of N,N-dimethylacrylamide and 2-acrylamido 2-methyl propane sulfonic acid, and copolymers of 2-acrylamido, 2-methyl propane sulfonic acid and acrylamide.

7. The composition of claim 6 wherein said second additive is present in an amount in the range of from about 0.01% to about 2.0% by weight of the cement.

8. A method of cementing a conduit in a borehole penetrating an earthen formation by introducing a cementing composition into the space between said conduit and said formation, wherein said cementing composition comprises water; hydraulic cement; and a water-soluble additive consisting essentially of a polymer prepared by caustic-catalyzed condensation of formaldehyde with acetone or a substance derived from acetone, wherein said polymer contains sodium sulfonate groups.

9. The method of claim 8 wherein said additive is present in an amount in the range of from about 0.1% to about 5.0% by weight of the cement.

10. The method of claim 9 wherein said additive is present in an amount in the range of from about 0.5% to about 1.5% by weight of the cement.

11. The method of claim 10 wherein said substance derived from acetone is methyl vinyl ketone.

12. The method of claim 10 wherein the sodium sulfonate groups of said polymer are incorporated via addition of sodium sulfite or sodium bisulfate to the condensation reaction mixture.

13. The method of claim 9 wherein said cementing composition further comprises a second additive selected from the group consisting of hydroxyethyl cellulose, carboxymethylhydroxyethyl cellulose, copolymers of N,N-dimethylacryamide and 2-acrylamido, 2-methyl propane sulfonic acid, and copolymers of 2-acrylamido, 2-methyl propane sulfonic acid an acrylamide.

14. The method of claim 13 wherein said second additive is present in an amount in the range of from about 0.1% to about 2.0% by weight of the cement.

15. A dispersing fluid loss agent useful in cements for use in oil, gas, and water wells comprising a water-soluble first polymer prepared by caustic-catalyzed condensation of formaldehyde with acetone or a substance derived from acetone wherein said polymer contains sodium sulfonate groups and a second fluid loss component selected from the group consisting of hydroxyethyl cellulose, carboxymethylhydroxyethyl cellulose, copolymers of N,N-dimethylacrylamide and 2-acrylamdio, 2-methyl propane sulfonic acid and copolymers of 2-acrylamide, 2-methyl propane sulfonic acid and acrylamide.

16. The dispersing fluid loss agent of claim 15 wherein said first polymer and said second fluid loss component are present in an amount sufficient to produce a weight ratio of first polymer to second fluid loss component of about 4 to 1.

17. The dispersing fluid loss agent of claim 15 wherein said first polymer and said second fluid loss component are present in an amount sufficient to produce a ratio of about 5 to 9 parts by weight of first polymer to about 1 to 5 parts by weight of second fluid loss component.

18. The dispersing fluid loss agent of claim 15 wherein the said substance derived from acetone is methyl vinyl ketone.

19. The dispersing fluid loss agent of claim 15 wherein the sodium sulfonate groups of said polymer are incorporated via addition of sodium sulfite or sodium bisulfite to the condensation reaction mixture.

* * * * *